United States Patent Office 3,271,368
Patented Sept. 6, 1966

3,271,368
SULFONATE-THIOCARBONATE COPOLYMERS
Eugene P. Goldberg, Highland Park, and Frank Scardiglia, Arlington Heights, Ill., assignors to Borg-Warner Corporation, Chicago, Ill., a corporation of Illinois
No Drawing. Filed May 2, 1963, Ser. No. 277,482
6 Claims. (Cl. 260—49)

This invention relates in general to linear condensation copolymers. More specifically, this invention is directed to polyester copolymers prepared from bisphenols, aromatic disulfonyl chlorides and thiophosgene and to their method of preparation. This application is a continuation-in-part of a copending application entitled "Resinous Compositions," SN 184,677 filed April 3, 1962, now abandoned, and assigned to the assignees of the present invention.

A variety of polyester homopolymers and copolymers are known in the art. These polyesters find utility in various specific commercial applications. Though useful, the prior art polyesters generally lack the most desirable combination of properties necessary for wide spread commercial use in the plastics industry.

More versatile linear condensation polymers include the aromatic polysulfonate copolymers, such as those disclosed and claimed in our prior filed applications, SN 80,014 and SN 118,480 filed January 3, 1961, and April 24, 1961, respectively and the aromatic thiocarbonate polymers disclosed and claimed in our prior application SN 184,685 filed April 3, 1962. These disclosures may be referred to herein, for a more complete understanding of the present invention.

The new copolymer compositions of the present invention have highly desirable physical, chemical and electrical properties, together with other long sought attributes of commercial importance. More particularly, the new class of linear condensation polymers herein described and claimed possesses a unique and extraordinary balance of properties. These copolymers have high tensile strength, at high as well as low temperatures, high melting points, high heat distortion points and good craze resistance. Additionally, these copolymers exhibit exceptional hydrolytic and aminolytic stability. This combination of highly desirable physical and chemical properties adapted these polymers for use as tough films, fibers, molded parts, protective coatings, adhesives, and the like.

The compositions of the present invention comprise new linear copolyesters containing sulfonate and thiocarbonate ester structural units. The sulfonate and thiocarbonate units are preferably derived from at least one bisphenol reacted with at least one biphenyldisulfonyl chloride and thiophosgene.

In terms of structure, the new linear copolyesters of this invention are comprised of recurring (1) sulfonate ester structural units of the formula

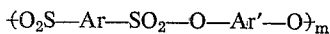

and (2) thiocarbonate ester structural units of the formula

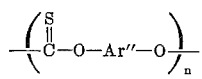

wherein Ar, Ar′, and Ar″ are bivalent aromatic groups and sub $m$ and $n$ are integers equal to or greater than one.

The copolymers of the present invention are preferably prepared utilizing at least one bisphenol reacted with an equimolar quantity of acid chlorides comprising at least one biphenyldisulfonyl chloride and thiophosgene. The biphenyldisulfonyl chloride comprises from about 25 mole percent to about 75 mole percent of the total acid chloride mixture and correspondingly, the thiophosgene comprises from about 75 mole percent to about 25 mole percent of the mixture.

Although the materials of this invention may be prepared by conventional condensation procedures, it is preferred to conduct the polycondensation by an interfacial polymerization technique. Polymerizations may be carried out at or near room temperature by mixing a basic aqueous solution of an alkali metal salt of at least one bisphenol with the thiophosgene and biphenyldisulfonyl chloride contained in an inert organic solvent. The addition of a basic organic catalyst such as a quaternary ammonium salt or a suitable amine is useful in promoting higher molecular weights. The reaction mixture is preferably stirred vigorously for varying periods of time, and the copolymers precipitated or coagulated by any suitable means, as, for example, by addition of a non-solvent such as methanol. The precipitated copolymers are generally washed to remove any residual impurities and dried.

The organic solvent utilized for the biphenyldisulfonyl chloride-thiophosgene mixture may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range from less than 1 weight percent to more than 20 weight percent, being limited at the high concentrations only by the increasing difficulties encountered in handling the extremely viscous media resulting from the polymer formation. Although it is preferred to use approximately equimolar quantities of bisphenol and biphenyldisulfonyl chlorides-thiophosgene, the reactivity of the biphenyldisulfonyl chloride and thiophosgene as well as the reaction conditions are such that the use of exact stoichiometry is not critical to the attainment of relatively high molecular weights. The mode of addition of the biphenyldisulfonyl chlorides and thiophosgene to the bisphenol is governed by the nature of the copolymer desired and it is possible to add incrementally or to batch mix the reactants if desired. The biphenyldisulfonyl chloride and the thiophosgene need not be added together, but may be added one at a time or as alternate increments, again depending upon the polymer structure sought. Additionally, it is possible to invert the order of addition of reactants and add the bisphenol to the biphenyldisulfonyl chloride and/or thiophosgene.

The basic organic catalyst also may be added initially or during the course of the polycondensation or may be added incrementally during the reaction. Although benzyltrimethylammonium chloride is a particularly effective catalyst, other quaternary salts and suitable amines are also effective. The amount of catalyst added may vary from less than .01 weight percent to more than 1.0 weight percent. Although the polymerization temperature may be varied over a wide range, as for example, from less than 0° C. to more than 100° C., it is most convenient to conduct the reaction at or about room temperature, i.e., 25° C.

The copolymers of the present invention are preferably prepared as above indicated and comprise the following recurring structural units in their polymer chain, (A) bisphenol biphenyldisulfonate ester structural units

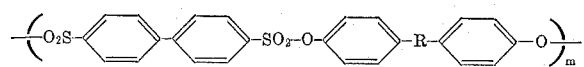

Formula A and (B) bisphenol thiocarbonate ester structural units

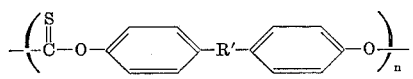

EXAMPLES I THROUGH VII

| Example | I | II | III | Comparative Commercial High-Performance Thermoplastics [1] | | | |
|---|---|---|---|---|---|---|---|
| | | | | IV | V | VI | VII |
| Thiophosgene, Mole percent | 75 | 50 | 25 | | | | |
| 4,4'-Biphenyldisulfonyl Chloride (Mole percent) | 25 | 50 | 75 | | | | |
| Intrinsic Viscosity (Measured in tetrachloroethane dl./g.) | 1.2 | 1.2 | 1.3 | | | | |
| Stability (Weight Change, percent): | | | | | | | |
| 10% NaOH, Refluxed 20 Hours | 0.4 | 0.5 | 0.5 | [2] N.C. | −49.0 | [2] N.C. | −17.0 |
| 10% NH₃, 25° C., 1 Week | −35.8 | −1.8 | 0.8 | [2] N.C. | [2] N.C. | [2] N.C. | −67.0 |
| Percent Weight Loss in Air, 1 Week, 200° C | 1.7 | 1.0 | 0.6 | 2.6 | 100.0 | 5.0 | 0.5 |
| Heat Distortion Temperature, ° C. 264 p.s.i. (Micro-Test) | 163 | 172 | 174 | 93 | 100 | 66 | 138 |
| Ultimate Tensile Strength, p.s.i.: | | | | | | | |
| 25° C | 7,000 | 8,400 | 7,900 | 5,600 | 8,000 | 10,000 | 8,6.0 |
| 150° C | 4,000 | 4,300 | 4,500 | [3] N.S. | [3] N.S. | 5,800 | 4,200 |

[1] IV ABS Polymer. V Polyacetal. VI Polyamide. VII Polycarbonate.
[2] N.C.—No Change.
[3] N.S.—No Strength.

Formula B wherein the radicals R, R' are selected from alkyl and alkylidene groups, and $m$ and $n$ are any whole number equal to or greater than one.

The order and relative proportion of A and B may be widely varied as indicated above. It may be noted that the sulfur and linking oxygen atoms of the sulfonate groups in Formula A and the linking oxygen atoms of the thiocarbonate groups in Formula B are bonded directly to aromatic group ring carbon atoms.

Bisphenol-A, i.e., 2,2-bis-(4-hydroxyphenyl)-propane is the preferred bisphenol utilized in the present invention, however, any bisphenol conforming to the general formula

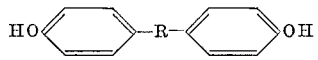

wherein R is an alkyl or alkylidene group, may be used. Examples of such bisphenols are bis-(4-hydroxyphenol)-methane; 1,1-bis-(4-hydroxyphenyl)-ethane; 1,2-bis-(4-hydroxyphenyl)-ethane; 1,1-bis-(3 - chloro-4 - hydroxyphenyl)-ethane; 1,1-bis-(3,5-dimethyl-4-hydroxyphenyl)-ethane; 2,2-bis-(4-hydroxyphenyl)-pentane; 2,2-bis-(4-hydroxyphenyl)-hexane; bis-(4-hydroxyphenyl)-cyclohexyl-methane; and 1,1-bis-(4-hydroxyphenyl)-1-phenylethane.

The examples following the typical experimental procedure given below are illustrative of the preparation of aromatic sulfonate-thiocarbonate copolymers from at least one bisphenol, biphenyldisulfonyl chloride, and thiophosgene.

A solution of Bisphenol-A (0.348 mole; 79.5 g.) in aqueous caustic (0.766 mole; sodium hydroxide dissolved in 800 ml. of water) was charged to a glass reactor equipped with a high shear agitator. The solution was cooled to about room temperature, i.e., 25° C. and 40 drops of a 60% aqueous solution of benzyltrimethylammonium chloride was added. To this aqueous phase, there was added over a 35 minute period with vigorous agitation, an organic phase consisting of thiophosgene (0.261 mole; 30.0 g.) and 4,4'-biphenyldisulfonyl chloride (0.087 mole; 30.5 g.) dissolved in 1,100 ml. methylene chloride. The reaction mixture was stirred for an additional 15 minutes. The development of a high molecular weight copolymer was evidenced by the increase in viscosity of the reaction mixture. The copolymer was isolated by precipitation with methanol in a high shear mixer and was purified by repeated washing with methanol and with water. The product was dried at about 75° C. in a vacuum oven for a period of about 16 hours.

The molar ratio of disulfonyl chloride to thiophosgene as well as the physical properties of the copolymers will be summarized in Table 1.

As shown in Table 1, Examples I, II and III, there is an increase in stability of the copolymers as the mole percent of sulfonate is increased. In the case of the aminolytic stability, there is a marked increase in stability as the amount of sulfonate is increased from 25 mole percent to 50 mole percent. The weight loss in air at 200° C. is reduced as the mole percent of sulfonate is increased.

The heat distortion temperature is extraordinarily high at all ratios of sulfonate to thiocarbonate, however, the heat distortion temperature is improved as the sulfonate mole percent is increased.

To further illustrate the unique and more desirable property balance for the aromatic sulfonate-thiocarbonate compositions of this invention, property comparison with commercially available high performance thermoplastics is provided in Table 1. Clearly, the sulfonate-thiocarbonate copolymers provide a much improved combination of chemical stability and physical properties. The copolymers of this invention also exhibit superior stress crack resistance under both thermal and solvent stress crack test conditions as compared with polycarbonates and ABS polymers.

The copolymers as described above are useful for a wide variety of applications. For example, they may be used for injection molded parts, as cast or extruded films, coatings, adhesives and fibers, as well as a variety of other applications that necessitate high heat distortion temperatures, good chemical stability, and high strength characteristics.

Although the invention has been described in detail with reference to certain preferred embodiments, it will be understood that variations and modifications can be effected without departing from the spirit and scope of the invention as described hereinabove and as defined in the appended claims.

What is claimed is:

1. A linear copolymer composition comprising in its linear chain from about 25 mole percent to about 75 mole percent (1) sulfonate ester structural units of the formula

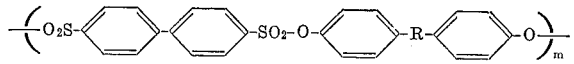

and correspondingly from about 75 mole percent to about 25 mole percent (2) thiocarbonate ester structural units of the formula

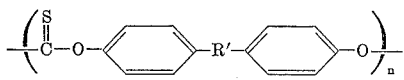

wherein *m* and *n* are at least one and R and R' are selected from the groups consisting of alkyl and alkylidene groups.

2. A linear copolymer composition comprising in its linear chain from about 25 mole percent to about 75 mole percent recurring (1) bisphenol p,p'-biphenyldisulfonate ester groups and correspondingly from about 75 mole percent to about 25 mole percent (2) bisphenol thiocarbonate ester groups wherein the sulfur and linking oxygen atoms of the sulfonate groups and the linking oxygen atoms of the thiocarbonate groups are bonded directly to aromatic ring carbon atoms.

3. The copolymer of claim 2 wherein the bisphenol is 2,2-bis-(4-hydroxyphenyl)-propane.

4. A linear copolymer composition comprising in its linear chain recurring bisphenol biphenyldisulfonate ester groups and recurring bisphenol thiocarbonate ester groups, the sulfonate ester groups comprising from about 25 mole percent to about 75 mole percent of the total composition and correspondingly, the bisphenol thiocarbonate ester groups comprising from about 75 mole percent to about 25 mole percent of the total composition.

5. A linear copolymer composition comprising in its linear chain recurring bisphenol p,p'-biphenyldisulfonate ester groups and recurring bisphenol thiocarbonate ester groups, the sulfonate ester groups comprising from about 25 mole percent to about 75 mole percent of the total composition and correspondingly, the bisphenol thiocarbonate ester groups comprising from about 75 mole percent to about 25 mole percent of the total composition.

6. A copolymer of claim 5 wherein the bisphenol is 2,2-bis-(4-hydroxyphenyl)-propane.

References Cited by the Examiner
UNITED STATES PATENTS 3,028,365    4/1962    Schnell _____ 260—47 X

FOREIGN PATENTS 585,882    6/1960    Belgium.
597,208    5/1961    Belgium.

WILLIAM H. SHORT, *Primary Examiner.*

J. C. MARTIN, *Assistant Examiner.*